Dec. 26, 1967 W. KAFKA 3,360,692

DEVICE FOR PRODUCING HIGH-INTENSITY MAGNETIC FIELDS OF SHORT DURATION

Filed Dec. 22, 1964 3 Sheets-Sheet 3

3,360,692
Patented Dec. 26, 1967

3,360,692

DEVICE FOR PRODUCING HIGH-INTENSITY MAGNETIC FIELDS OF SHORT DURATION

Wilhelm Kafka, Tennenlohe, near Erlangen, Germany, assignor to Siemens-Schuckertwerke Aktiengesellschaft, Berlin-Siemensstadt, Germany, a corporation of Germany Filed Dec. 22, 1964, Ser. No. 420,363
Claims proirity, application Germany, Dec. 24, 1963, S 88,895; July 25, 1964, S 92,264
19 Claims. (Cl. 317—123)

My invention relates to devices for producing high-intensity magnetic fields of short duration. More particularly, my invention relates to devices for producing high-intensity magnetic fields of short duration and for the momentary weakening of such magnetic fields.

Various purposes such as, for example, ultra-high temperature or hydrogen-fusion research, plasma techniques such as, for example, the confinement of plasma in a magnetic-mirror, picket-fence or pinch geometry, require magnetic fields of extremely high intensity. Often the required field strength is so extreme that conventional magnet coils are insufficient. If in such cases a permanent performance of a magnet is not needed, the magnetic fields may be produced by discharging storage capacitors through a magnet winding. Very large energy storing capacitor banks must be provided for such purposes. It is difficult to combine the capacitor currents for connection to a spatially narrowly limited coil and to withstand the mechanical forces accompanying the capacitor discharges.

It is an object of my invention to provide a device for producing highly intensive magnetic fields of short duration which achieves the desired results with a much smaller amount of equipment and avoids the aforementioned difficulties.

Another, more specific, object of the invention is to eliminate the need for large capacitors or other energy-storing components extraneous to the inductance windings used for producing or controlling the magnetic fields.

In accordance with the present invention, a device for producing intensive magnetic fields of short duration comprises a superconducting primary excitation winding, a secondary winding inductively coupled with the excitation winding, a normal conductance load winding connected to the secondary winding to be energized therefrom, and transition control means for changing the excitation winding, while traversed by direct current, from superconductance to normal conductance.

In such a device, the superconducting excitation winding operates as an energy storer. The stored energy is transmitted to the load winding, this being the winding employed for producing the magnetic field to be utilized, by means of the secondary winding which is magnetically or inductively coupled with the excitation winding. When the direct current circuit of the excitation winding is interrupted, approximately one-half of the magnetic energy of the excitation winding is transferred to the secondary circuit. However, the interruption of the excitation circuit is not effected by means of a switch, but is produced by the transition of the superconducting excitation winding. As a result, the high induction voltage does not detrimentally affect any switching device but is attenuated in the high ohmic excitation winding without manifesting itself externally and without stressing any electrical insulation.

For securing a good utilization of the stored energy, and in accordance with another feature of my invention, the device is further provided with means for propagating the transition, usually commencing at one locality of the excitation winding, as rapidly as possible over the entire excitation winding. Such transition propagating means may comprise resistors which bridge respective portions of the excitation winding and have a resistance smaller by at least one order of magnitude than the resistance value of the bridged and shunted winding portion when the latter is in the condition of normal conductance. A particularly rapid propagation of the transition over the excitation winding is secured by means of resistance bridges which connect each winding turn at several points along the circumference, or along the entire circumference, with the two adjacent turns. When the transition commences at any one point of a turn, the adjacent turns are then immediately affected.

Another way of providing for transition propagating means in accordance with the invention is to surround each layer, or each second layer of the excitation winding, with a good heat conducting, axially slitted jacket of metal. Such a metal jacket does not completely surround the axis of the excitation winding because it would then act as a short-circuiting winding, when transition occurs, and would thus convert a large portion of the energy into heat instead of having this energy portion transferred to the secondary circuit.

In order that the present invention may be readily carried into effect, it will now be described with reference to the accompanying drawings, wherein.

Figure 1:
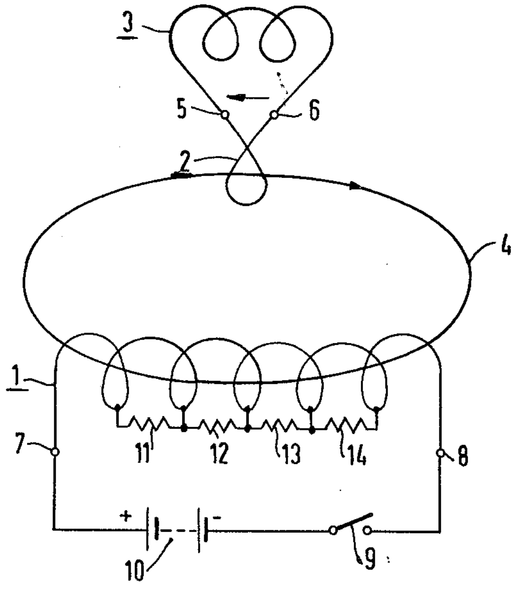
FIG. 1 is a schematic diagram which illustrates the principle of an embodiment of the device of the present invention.

In FIG. 1, the device of the present invention comprises a superconducting primary excitation winding 1, a secondary winding 2, and a load winding 3. The secondary winding 2 is conductively coupled with the excitation winding 1, as schematically indicated by a magnetic flux 4. The load winding 3 is connected to the output terminals 5 and 6 of the secondary winding to be energized therefrom.

A direct current source 10 is connected through a normally open switch 9 between the terminals 7 and 8 of the excitation winding 1. The excitation winding 1 is tapped, and the sequential winding portions are shunted by respective bridging resistors 11 to 14. The bridging resistors 11 to 14 serve to accelerate the transistion of the excitation winding.

Assume that the superconducting excitation winding 1 is at cryogenic temperature below the transition point and is therefore in superconducting condition, and that the switch 9 has been open for a period of time so that said exctation winding does not contain stored energy. When the direct voltage source 10 is connected to the excitation winding 1 by closing of the switch 9, a magnetic field commences to be built up.

The rate of the increasing field intensity depends upon the charging time constant and proceeds sufficiently slowly to prevent variation of the superconducting condition of the excitation winding. As a rule, an interval of approximately 1000 seconds is required if the excitation winding is to be supplied with an energy content of approximately $14 \cdot 10^6$ watt seconds. During the building-up period, the flux 4 through the secondary winding 2 changes accordingly. Due to the considerably smaller number of turns in the secondary winding 2, however, the voltage induced in the secondary winding during this period is so low that due to the ohmic resistance in the secondary circuit, virtually no current flows in said secondary circuit.

When during the charging of the excitation winding a given value of energy and thus a given current value is reached, the excitation winding commences at one spot to go into transition. The transition is very rapidly propagated over the entire excitation winding 1, due to the resistors 11, 12, 13 and 14. This is because the one winding portion that goes into transition is virtually bridged by the parallel connected resistor so that the share of magnetic flux or induction normally corresponding to this winding portion, must be taken over by the other winding portions which are thus more rapidly brought to normal conductance.

When the entire excitation winding 1 has been converted to normal conductance, it exhibits a high ohmic voltage drop which must be produced by a reduction in magnetic flux. This reduction in flux induces in the closely coupled secondary winding 2 a voltage which within a relatively short interval of time drives an extremely large amount of current through the load coil 3 and produces a correspondingly strong magnetic field therein. The current then decays in accordance with the discharging time constant of the secondary circuit.

With a suitable dimensioning of the secondary circuit, time constants in the order of one second can be readily obtained. For exemplifying the dimensional relations the following tabulation is offered, this table being in accordance with a tested example. In the following table, the excitation winding 1 comprised superconducting material consisting of niobium zircon, having 25% zircon. The superconducting effect may be attained with other suitable materials such as, for example, niobium titanium, niobium titanium zircon, niobium tin or vanadium gallium. "Soft" superconducting material is not suitable due to the resulting high field intensity.

copper or silver. To increase the heat capacity, the jackets 15 may also consist of lead. To prevent short-circuiting, the jackets 15 are axially slitted.

The winding space of the excitation winding 1 is located in a closed hollow cylinder 16 which, for reducing losses, is made of a thin sheet of material having a high resistance coefficient. Particularly suitable for this purpose is a nickel-chromium alloy as utilized in electrical resistors. The hollow cylinder 16 has a supply nipple 17 and an outlet nipple 18 for the cryogenic medium such as, for example, liquid helium. Mounted on the outer walls of the hollow cylinder 16 are vanes or fins 19 of good heat conducting material which dissipate the heat, occurring at transition, to another cooling medium. The vanes or fins 19, like the metal jackets 15, are not fully closed around the periphery.

The hollow cylinder 16 is surrounded by another hollow cylinder 20 also comprising a thin sheet and made of material having a high specific resistance such as the aforementioned nickel-chromiuc alloy. The space between the two hollow cylinders may be supplied with fluid coolant such as, for example, water, through an inlet 21 and an outlet 22. The entire assembly is completely enveloped in a heat protective enclosure 23 of heat-insulating material. The secondary winding 2 is mounted on the insulating enclosure 23. The load winding 3 is not shown in FIG. 2.

Figure 2:
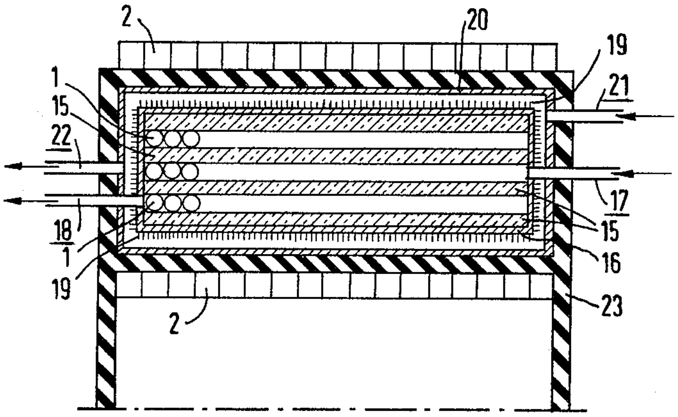
FIG. 2 is a view, partly in diametrical section, of a portion of an embodiment of the device of the present invention.
Figure 3:
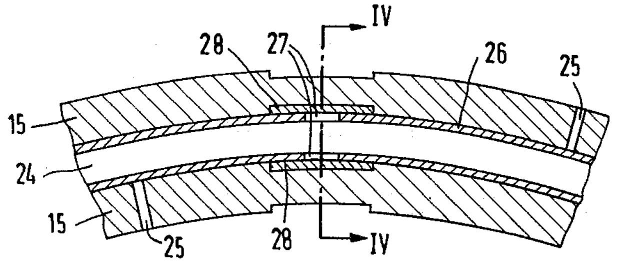
FIG. 3 is a side elevation in section, of a detail of FIG. 2 on a larger scale.

FIG. 3 is an enlarged portion of the device of FIG. 2, and illustrates part of a conductor 24 of the excitation winding 1, as well as two adjacent metal jackets 15. The axial slits 25, which prevent the jackets 15 from forming a short-circuit, also serve as conduits for the cooling liquid. The conductor 24 is surrounded by a wire insulation 26 of asbestos or glass fiber. Such a heat-resistant inorganic insulation is desirable to prevent the locally occurring high temperatures in the order of 500 to 600° K. from damaging the insulation. The insulation 26 is locally removed at one or more places of each turn, and the resulting hollow space is filled with a resistance material 27 which is cast into the space. Mica discs 28 are utilized to insulate the spaces filled with the resist-

| | Excitation winding 1 | Secondary winding 2 | Load winding 3 |
|---|---|---|---|
| Number of turns | $W1=6.3\times10^5$ | $W2=61$ | $W3=880$. |
| Self-inductivity | $L1=2.8\times10^5$ H | $L2=2.6\times10^{-3}$ H | $L3=26\times10^{-3}$ H. |
| Resistance of winding (normal conductance). | $R1=20\times10^6$ ohm | $R2=1.1\times10^{-3}$ ohm | $R3=90^{-3}$ ohm |
| Median diameter of winding | $d1=100$ cm | $d2=100$ cm | $d3=20$ cm. |
| Axial length | $l1=100$ cm | $l2=100$ cm | $l3=100$ cm. |
| Charging time | $T=1000$ sec | | |
| Charging voltage | $U=800$ V | | |
| Discharge time constant | $T1=14$ msec | T (2+3)=310 msec. | |
| Energy content | $E1=14.3\times10^6$ Wsec | $E2=5.2\times10^5$ Wsec | $E3=5.2\times10^6$ Wsec. |
| Induction | | | 200kG in 8 liter volume (=10 cm. diameter, 100 cm. length). |

The foregoing table indicates that the self-inductivity of the secondary winding 2 is approximately one tenth of the load winding 3.

In principle, theory shows that only one-half of the energy stored in a magnetic storer can be removed by a switching operation, the other half being converted into heat. In the present case, the switch is constituted by the excitation winding 1 as it goes from superconductance into transition. Consequently, the invention involves the problem of dissipation of the heat generated in the excitation winding during transition. Therefore, care must be taken to provide for a correspondingly large heat absorption capacity in the area around the excitation winding 1 and for a rapid dissipation of the heat. The embodiment of FIG. 2, hereinafter described, exemplifies a satisfactory solution of this problem.

In FIG. 2, the excitation winding 1, consisting of a tubular winding of niobium stannate ($Nb_3Sn$) or other superconducting material, is embedded between metal jackets 15 of good heat conducting material, preferably ance material 27 from the corresponding adjacent copper jackets 15.

Figure 4:
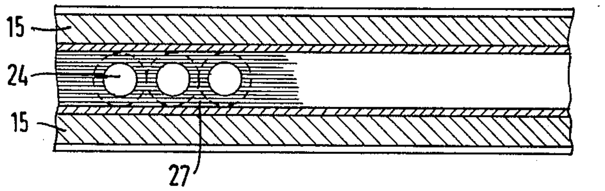
FIG. 4 is a section taken along the line IV—IV of FIG. 3.

FIG. 4 illustrates how the resistance material 27 connects adjacent turns with each other. As hereinbefore mentioned, the resistance material 27 functions to accelerate the transition. The resistance material 27 may comprise, for example, carbon or graphite which may be mixed with clay or other insulating powder or binding agents. The electric resistance material 27 is cast into the hollow space in the form of a suspension or in a soft consistency. A particularly rapid propagation of the transition with a simple design of the excitation winding 1 is achieved when the resistance material 27 utilized has a high resistance coefficient obtained by embedding the bare winding turns 24 of said excitation winding entirely into said resistance material. The base winding turns 24 are embedded only after care has been taken that adjacent turns do not contact each other, for example by providing for suitable spacer means such as loose filament or tape wound about the individual winding turns.

In the described embodiment of the device of the present invention, only the excitation widing 1 consists of superconducting material, whereas the secondary winding 2 and the load winding 3 consists of normal wire such as copper wire. However, the secondary winding 2 may also be made superconducting. In this case, care must be taken that the secondary winding 2 remains in superconducting condition when the excitation winding 1 makes the transition from superconductance to normal conductance.

A prolongation of the discharging time constant in the circuit of the secondary winding 2, and consequently a prolonged utilization of the induction in the load winding 3, is obtained if the secondary winding circuit is cooled each time shortly before transition occurs in the excitation winding 1. Cooling the secondary winding circuit down to about 100° K. reduces the resistance to about one tenth of the original resistance value and correspondingly increases the discharging time constant. The desired cooling may be achieved simply by using a tubular wire for the load winding 3 and, if desired, also for the secondary winding 2, and passing supercooled gas through the tubular wires shortly before the transition of the excitation winding 1.

The resistors used for accelerating the transition in the excitation winding 1 simultaneously protect said excitation winding from local excessive heating and destruction. If desired, additional safety means such as, for example, spark plugs, may be provided. In many cases it is also advisable to utilize safety valves for limiting any overpressure that may occur, for example, by evaporation of the helium or other cryogenic medium.

It is often desired to control the moment of transition at will. This is achieved by selecting a current flow or a magnetic induction of such a magnitude that it alone does not suffice to produce transition. Additional means may then be utilized to enforce a sudden change in the magnetic field or in the current flow or a sudden change in temperature in order to produce a sudden transfer of the excitation winding 1 to the condition of normal conductance.

According to another feature of my invention, the load winding 3 is positioned in the magnetic field of another current-traversed superconducting winding and is so connected that within said load winding the magnetic field produced by the said load winding is in a direction opposite that of the additional superconducting winding. The magnetic pulse field in the load winding 3 is thus superimposed in opposition to the strong permanent magnetic field of a superconducting coil with the result that a weakening of the permanent magnetic field is produced. The device consequently produces a magnetic field with a pulsewise breakdown; that is, a strong magnetic field of permanent characteristic is suddenly weakened for a short interval of time.

A modified device of this type is particularly well suited for the magnetic compression of plasma in apparatus operating with magnetic mirror geometry. For this purpose, the plasma is supplied at the moment of minimum induction into a hollow space surrounded by the load winding and is thereafter compressed by the subsequent increase of the induction.

A device of this type is also suited for suddenly reducing the tension of the plasma by pulsewise weakening of the induction, and transferring the plasma to another magnetic field space. It is understood that there are various other ways of utilizing the device of the present invention. For example, the magnetic attraction in a magnetic clutch may be temporarily interrupted by the device of the present invention for such purposes as controlling or regulating the slip between two shafts connected by said clutch.

Figure 5:
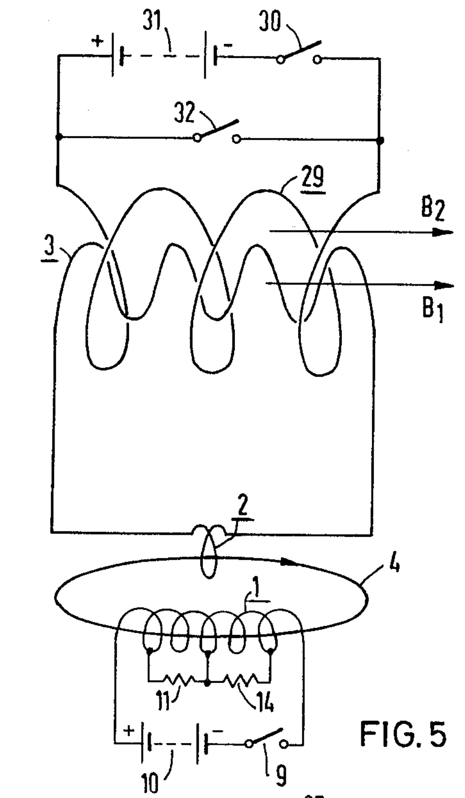
FIG. 5 is a schematic diagram which illustrates the principle of another embodiment of the device of the present invention.

A device of this type may comprise that shown in FIG. 5. FIG. 5 includes the basic circuit configuration hereinbefore described with reference to FIG. 1. FIG. 5 includes the superconducting excitation winding 1, the secondary winding 2, the load winding 3, the magnetic flux 4 between the excitation and secondary windings 1 and 2, the switch 9, the voltage source 10 and the respective resistors 11 to 14.

The pulselike magnetic field in the load winding 3 is utilized for weakening a permanent magnetic field produced by means of an additional superconducting winding. For this purpose, the load winding 3 is disposed within the turns of an additional superconducting winding 29. The additional superconducting coil 29 is connected through a normally open switch 30 to a direct current voltage source 31 and, after being fully excited and superconducting, may be short-circuited by a parallel-connected, normally open switch 32.

Figure 6:
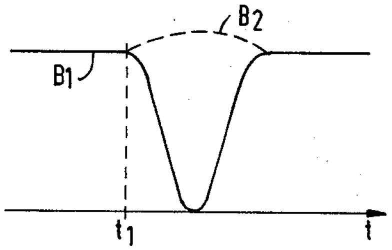
FIG. 6 is a graphical illustration relating to the embodiment of FIGS. 5 and 7.

The magnetic phenomena occuring in the superconducting winding 29 are schematically represented in FIG. 6. FIG. 6 shows a coordinate diagram of the magnetic induction B as the ordinate, versus time $t$ as the abscissa. In FIG. 6, the induction B1 is that within the load winding 3 operating with normal conductance, and the induction B2 is that between the normal conductance load winding 3 and the super-conducting winding 29.

When current flows through the additional super-conducting winding 29, the induction values B1 and B2 have a given, constant magnitude. When at the moment $t_1$ the superconducting excitation winding 1 goes into transition so that the load winding 3 is energized, the induction value B1 decreases because said load winding acts in opposition to the additional superconducting winding 29. The weakening of the magnetic field persists until the magnetic energy is converted to heat due to the ohmic losses in the circuit of the secondary winding 2 and the load winding 3. Thereafter, the induction in the load winding 3 again attains its original value.

The depth of the momentary dip in the induction curve B1 depends upon the magnitude of the magnetic energy stored in the superconducting excitation winding 1. The width or duration of the dip depends upon the rate of decline and incline. The decline may be accelerated by utilizing a coil of relatively low inductivity and large length of wire such as, for example, a coil having a relatively small diameter and a relatively large length.

A rapid increase in inductivity is obtained by utilizing for the circuit of the secondary winding a wire having a high thermal coefficient of electrical resistance and the largest feasible range of temperature. For these reasons, it is preferable to utilize as the secondary winding 2 and the load winding 3 a metal wire cooled down to 4° to 20° K. This wire may comprise, for example, copper, silver or aluminum and is loaded with a very high current density. The ohmic resistance then increases during the current surge by heating up to 400° K. for example, that is by a factor having an order of magnitude of 100. The metal quantity and energy content are so adapted that the wire will just reach a temperature which is below that which would damage the insulation of the winding. It is advisable to utilize an insulation resistant to high temperatures such as, for example, glass fiber or asbestos insulation.

The induction curve B2 increases during the time that the induction curve B1 dips. This is due to the fact that the effect of the load winding 3 urges the field of the additional superconducting winding 29 away from the interior. Since the total flux in the additional superconducting winding 29 remains preserved because said winding is short-circuited so that there is no change in flux, the induction $B_2$ outside of the load winding 3 must increase and the current in said superconducting winding 29 must also increase.

Figure 7:
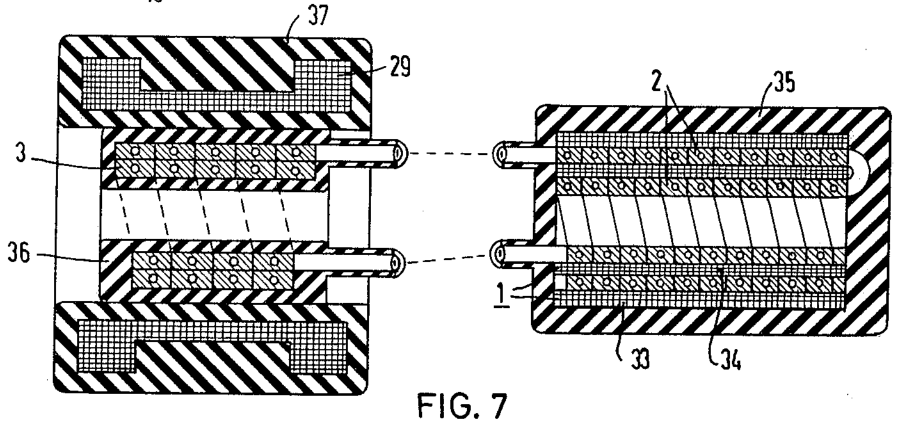
FIG. 7 is a sectional view of the embodiment of FIG. 5.

In FIG. 7, the superconducting excitation winding 1 alternates with two coaxial layers 33 and 34 of the secondary winding 2. The turns of the secondary winding 2 comprise tubular conductors traversed by cooling liquid or cooling gas. The secondary winding 2 is tightly coupled magnetically with the superconducting excitation winding 1. Both windings 1 and 2 are surrounded by heat insulation 35. The load winding 3 is of a design similar to that of the secondary winding 2 and is mounted within the additional superconducting winding 29.

As mentioned, when the magnetic field is being guided away from the load winding 3 by the current pulse, the additional superconducting winding 29 must be protected from damage. As mentioned, the induction in the space between the load winding 3 and the additional superconducting winding 29 and the current in said additional superconducting winding momentarily increase during the interval or duration of a current pulse. For these reasons, the inner diameter of the additional superconducting winding 29 is more than twice as large as the inner diameter of the load winding 3. Furthermore, the heat insulation 36 is made sufficiently thick between the load winding 3 and the additional superconducting winding 29 to prevent said additional superconducting winding from being affected by the heat generated in said load winding due to the current pulse.

The number of turns of the additional superconducting winding 29 is larger at both axial ends than in the middle thereof. In this manner, the additional superconducting winding 29 is designed as a "magnetic bottle." As shown, all the turns of the additional superconducting winding 29 are covered, surrounded or enveloped by heat insulation 37.

To those skilled in the art, it will be obvious from a study of this disclosure that my invention permits of various modifications and may be given embodiments other than illustrated and described herein, without departing from the essential features of my invention and within the scope of the claims annexed hereto.

I claim:

1. A device for producing high intensity magnetic fields of short duration, comprising
- a superconducting primary excitation winding, said primary excitation winding having a number of turns having ohmic resistance and inductivity;
- direct current supply means electrically connected to said primary excitation winding for producing a current flow through said primary excitation winding;
- a secondary winding inductively coupled with said primary excitation winding, said secondary winding having a number of turns considerably less than those of said primary excitation winding and having considerably less ohmic resistance and considerably less inductivity than said primary excitation winding;
- a normal conductance load winding electrically connected to said secondary winding and energized by said secondary winding; and
- transition control means connected to a plurality of spaced points on said primary excitation winding for changing said primary excitation winding from superconductance to normal conductance.

2. A device for producing high intensity magnetic fields of short duration as claimed in claim 1, wherein said transition control means comprises means for rapidly propagating the transition of said primary excitation winding from a selected area thereof to the entire extent thereof.

3. A device for producing high intensity magnetic fields of short duration as claimed in claim 1, wherein said primary excitation winding has a plurality of tapping points thereon and wherein said transition control means comprises a plurality of resistors each connected between corresponding ones of the tapping points of said primary excitation winding, said plurality of resistors being connected in series arrangement with each other.

4. A device for producing high intensity magnetic fields of short duration as claimed in claim 3, wherein the resistance values of said plurality of resistors are considerably smaller than the resistance values of the primary excitation winding in its condition of normal conductance between the corresponding tapping points.

5. A device for producing high intensity magnetic fields of short duration as claimed in claim 1, wherein said primary excitation winding comprises a plurality of bare turns embedded in resistance material.

6. A device for producing high intensity magnetic fields of short duration as claimed in claim 1, wherein said primary excitation winding comprises a plurality of turns surrounded by an axially slitted metal jacket of good heat conductivity.

7. A device for producing high intensity magnetic fields of short duration as claimed in claim 6, wherein said jacket comprises one of the group consisting of copper and silver.

8. A device for producing high intensity magnetic fields of short duration as claimed in claim 1, further comprising heat absorbing material and heat conducting material, and wherein said primary excitation winding comprises a plurality of turns in contact with said heat absorbing material through said heat conducting material.

9. A device for producing high intensity magnetic fields of short duration as claimed in claim 1, further comprising fluid cooling means for cooling at least one of said secondary winding and said load winding with cooling fluid at determined times.

10. A device for producing high intensity magnetic fields of short duration as claimed in claim 1, wherein said secondary winding is superconducting.

11. A device for producing high intensity magnetic fields of short duration as claimed in claim 10, wherein said secondary winding is superconducting during and after transition of said primary excitation winding from superconductance to normal conductance.

12. A device for producing high intensity magnetic fields of short duration as claimed in claim 1, wherein each of said secondary and load windings has a determined inductance, the inductance of said secondary winding being about one tenth the inductance of said load winding.

13. A device for producing temporarily weakened high intensity magnetic fields of short duration, comprising
- a superconducting primary excitation winding;
- direct current supply means electrically connected to said primary excitation winding for producing a current flow through said primary excitation winding;
- a secondary winding inductively coupled with said primary excitation winding;
- an additional superconducting excitation winding;
- additional direct current supply means electrically connected to said additional superconducting excitation winding for producing a current flow through said additional superconducting excitation winding; and
- a normal conductance load winding electrically connected to said secondary winding and energized by said secondary winding, said load winding being positioned in the magnetic field of said additional superconducting winding and producing a magnetic field in opposite direction to the magnetic field of said additional superconducting winding.

14. A device for producing temporarily weakened high intensity magnetic fields of short duration, comprising
- a superconducting primary excitation winding;
- direct current supply means electrically connected to said primary excitation winding for producing a current flow through said primary excitation winding;
- a secondary winding inductively coupled with said primary excitation winding;
- an additional superconducting excitation winding;
- additional direct current supply means electrically connected to said additional superconducting excitation winding for producing a current flow through said additional superconducting excitation winding;
- a normal conductance load winding electrically connected to said secondary winding and energized by said secondary winding, said load winding being positioned in the magnetic field of said additional superconducting winding and producing a magnetic field in opposite direction to the magnetic field of said additional superconducting winding; and transition control means connected to said primary excitation winding for changing said primary excitation winding from superconductance to normal conductance.

15. A device for producing temporarily weakened high intensity magnetic fields of short duration as claimed in claim 14, wherein said load winding has a diameter smaller than its length.

16. A device for producing temporarily weakened high intensity magnetic fields of short duration as claimed in claim 14, wherein at least one of said secondary winding and said load winding comprises a metal having a high thermal coefficient of electrical resistance.

17. A device for producing temporarily weakened high intensity magnetic fields of short duration as claimed in claim 14, wherein each of said secondary winding and said load winding has a high current density at very low temperatures.

18. A device for producing temporarily weakened high intensity magnetic fields of short duration as claimed in claim 14, wherein each of said secondary winding and said load winding is covered by inorganic temperature-resistant electrical insulation.

19. A device for producing temporarily weakened high intensity magnetic fields of short duration as claimed in claim 14, wherein each of said additional superconducting excitation winding and said load winding has an inner diameter and an outer diameter, the inner diameter of said additional superconducting excitation winding being more than twice as large as the inner diameter of said load winding.

References Cited

UNITED STATES PATENTS

| | | | |
|---|---|---|---|
| 3,263,133 | 7/1966 | Stekly | 317—123 |
| 3,218,482 | 9/1965 | Green | 307—88.5 |
| 3,214,637 | 9/1965 | Persson | 317—9 |
| 2,949,602 | 8/1960 | Crowe | 340—347 |
| 3,176,195 | 4/1965 | Boom et al. | 317—123 |
| 3,177,408 | 4/1965 | Mills et al. | 317—123 |
| 3,185,900 | 5/1965 | Jaccarino et al. | 317—123 X |

MILTON O. HIRSHFIELD, *Primary Examiner.*

D. YUSKO, J. A. SILVERMAN, *Assistant Examiners.*